A. D. CONVERSE.
ROCKING HORSE.
APPLICATION FILED MAY 27, 1912.
1,039,699.
Patented Oct. 1, 1912.
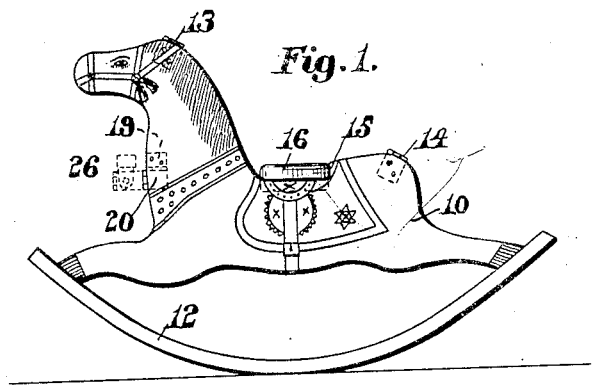
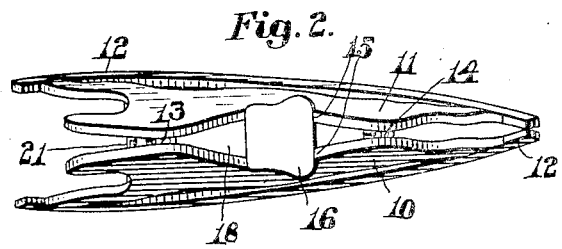
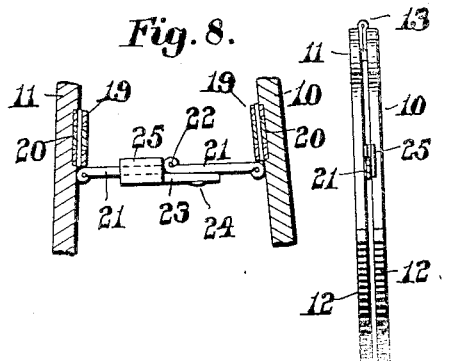
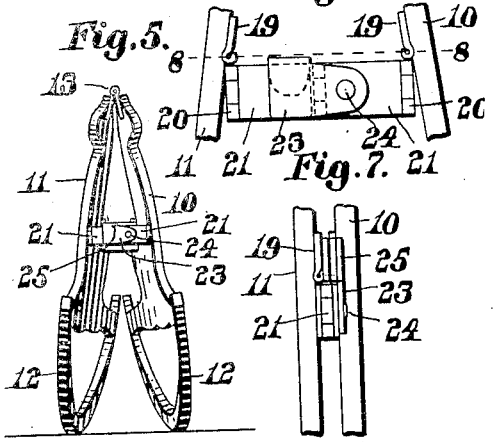
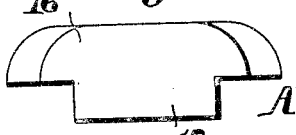
Witnesses:
N. C. Lombard
Edward F. Allen
Inventor:
Atherton D. Converse,
by Walter E. Lombard,
Atty.

UNITED STATES PATENT OFFICE.

ATHERTON D. CONVERSE, OF WINCHENDON, MASSACHUSETTS.

ROCKING-HORSE.

1,039,699.   Specification of Letters Patent.   Patented Oct. 1, 1912.

Application filed May 27, 1912. Serial No. 700,110.

*To all whom it may concern:*

Be it known that I, ATHERTON D. CONVERSE, a citizen of the United States of America, and a resident of Winchendon, in the county of Worcester and State of Massachusetts, have invented certain new and useful Improvements in Rocking-Horses, of which the following is a specification.

This invention relates to rocking horses and has for its object the provision of a device of this class which may be readily folded so as to occupy very little space when not in use.

The invention consists primarily in providing two like side members hinged together at the top with a folding brace hinged at its ends to the side members to retain the side members separated when in use, this separation of the two side members being assisted by a removable saddle member having an extension projecting downwardly between the upper edges of said side members.

The invention further consists in certain novel features of construction and arrangement of parts which will be readily understood by reference to the description of the drawings and to the claims hereinafter given.

Of the drawings: Figure 1 represents an elevation of a rocking horse embodying the features of the present invention. Fig. 2 represents a plan of the same in condition for use. Fig. 3 represents a similar view showing the saddle removed and the side members folded together. Fig. 4 represents a front elevation of the device folded. Fig. 5 represents a similar view with the side members separated ready for use. Fig. 6 represents an enlarged front elevation of the folding brace member and locking device therefor, showing the side members separated. Fig. 7 represents a similar view showing the said brace members folded. Fig. 8 represents a horizontal section of the same, the cutting plane being on line 8—8 on Fig. 6, and Fig. 9 represents a front elevation of the removable saddle member.

Similar characters designate like parts throughout the several figures of the drawings.

In the drawings, 10 and 11 are two side members of like design each provided with a curved rocker member 12. Preferably these side members 10 and 11 are formed to represent a horse as indicated in the drawings, but it is obvious that the shape of any other animal may be used. These side members 10 and 11 are connected together at the top by hinges 13 and 14 so that when the device is not in use two side members 10 and 11 may be folded as indicated in Figs. 3, 4, and 7 of the drawings. Each side member 10 and 11 is provided midway of the back of the horse or other animal with a shoulder 15 against which abuts the rear edge of a removable saddle member 16 having a downward extension 17 adapted to be interposed between the inner faces of the side members 10 and 11 to assist in retaining said side members separated as indicated in Figs. 2 and 5 of the drawings.

It is obvious from an inspection of the drawings that, owing to the contour of the horse, and the location of the hinges 13 and 14 at different levels thereon when the side members 10 and 11 are separated as more clearly shown in Fig. 2 of the drawings, a space 18 is left which is much wider midway of the hinges 13 and 14 than at points adjacent to said hinges, thus providing a means for the insertion of the downward projection 17 when the side members 10 and 11 are separated. Owing also to the location of the hinges 13 and 14 the side members 10 and 11 when separated are inclined to each other. The front parts of the rockers 12 are further separated than the rear ends thereof, as clearly shown in Figs. 2 and 5 of the drawings. To the inner face of the front part of each of the side members 10 and 11 is secured a member 19 having hinged thereto a member 20, to the front edge of which is hinged one part of a brace 21, the two parts of this brace being hinged together at 22, about the center of which the brace is adapted to be folded. It is obvious that when the folding brace 21 is extended with its two parts in alinement, as indicated in Fig. 8 of the drawings, the side members 10 and 11 are retained in contact with the side walls of the downward projection 17 of the saddle member 16, thus securing this saddle member in position and preventing the folding of the side members 10 and 11. At the same time the brace 21 provides a means for preventing the further separation of the side members 10 and 11. To prevent the accidental folding of the brace member a locking member 23 is pivoted at 24 to one of the parts 21 of said brace, this locking member being provided with a U-shaped hook portion 25 which is adapted to be moved into position over the other part 21 of said brace, thereby locking the brace in extended position so that it cannot be folded. When the side members are folded together this brace 21 folds outwardly into the position indicated in dotted lines at 26 on Fig. 1 of the drawings, or as indicated in full lines in Figs. 4 and 7.

While preferably the brace member 21 is located as indicated in the drawings, it is perfectly obvious that this could be positioned at some other point equally as well, and it is self-evident that other forms of brace members than that indicated in the drawings could be used without affecting the principles of the present invention, provided that the side members were held firmly in contact with the downward extension of the saddle and these members were prevented from further separation.

This makes a very convenient form of rocking horse which may be made at slight expense and occupy but very little space when not in use. This is of particular advantage to the manufacturer in the shipping of the devices, and is also of great advantage to the dealers, as when folded very little floor space is occupied, while, when it is desired to display one of the devices preparatory to a sale, it may be put in condition for use very quickly.

It is believed that the operation and many advantages of the invention will be fully understood from the foregoing.

Having thus described my invention, I claim:

1. A rocking horse comprising two like side members having rockers and joined together at or near the top; a saddle member provided with a downward extension adapted for insertion between said side members to retain them separated; and means for preventing further separation of said side members.

2. A rocking horse comprising two like side members having rockers; connections interposed between the upper portions of said side members permitting the separation thereof at the bottom; a seat portion resting on said side members when separated and provided with an extension interposed between them; and means for retaining said side members in contact with said extension.

3. A rocking horse comprising two like side members having rockers; connections interposed between the upper portions of said side members permitting the separation thereof at the bottom; a seat portion resting on said side members when separated and provided with an extension interposed between them; and means for preventing the further separation of said side members.

4. A rocking horse comprising two like side members having rockers; connections interposed between the upper portions of said side members permitting the separation thereof at the bottom with the front ends of the rockers farther apart than the rear ends; a seat portion resting on said side members when separated and provided with an extension interposed between them; and means for retaining said side members in contact with said extension.

5. A rocking horse comprising two like side members having rockers and joined together at or near the top; a saddle member provided with a downward extension adapted for insertion between said side members to retain them separated; a divided brace pivoted to said side members; and means for retaining said brace in extended position.

6. A rocking horse comprising two like side members having rockers and joined together at or near the top; a saddle member provided with a downward extension adapted for insertion between said side members to retain them separated; a brace consisting of two parts hinged together and each hinged to a side member; and means extending from one part to the other to lock said parts in alinement.

7. A rocking horse comprising two like side members having rockers and joined together at or near the top; a saddle member provided with a downward extension adapted for insertion between said side members to retain them separated; a brace consisting of two parts hinged together and each hinged to a side member; and a U-shaped member pivoted to one part and adapted to straddle the other part.

8. A rocking horse comprising two like side members having rockers and vertical shoulders; connections between the upper portions of said side members permitting the separation thereof at the bottom; a saddle member resting on said side members in contact with said shoulders; and means for preventing said side members from further separation.

9. A two-part rocking horse the two parts of which are so connected together as to permit them to be brought into contact with each other or to be separated at the bottom combined with a seat portion adapted to retain when positioned the separation of said two parts; and means for preventing further separation of said two parts.

10. A rocking horse comprising two like side members having rockers; hinged connections between the two side members at different distances from the rockers so that when said members are separated at the bottom a space is left between the upper edges of said side members from one hinge connection to the other; a seat member adapted to rest on the upper edges of said side members and provided with shoulders abutting the inner walls of said side members; and means for retaining said side members in contact with said shoulders.

11. A rocking horse comprising two inclined side members connected together at the top and having rockers; a removable saddle member having shoulders bearing against the inner walls of said side members; and a locking device for retaining said side members in contact with said shoulders.

12. A rocking horse comprising two inclined side members connected together at the top and having rockers further separated at the front than at the rear; a removable saddle member having shoulders bearing against the inner walls of said side members; and a locking device for retaining said side members in contact with said shoulders.

13. A rocking horse comprising two like side members having rockers; connections interposed between the upper portions of said members permitting the separation thereof at the bottom; and means for locking said members in separated position.

14. A rocking horse comprising two like side members having rockers; connections interposed between the upper portions of said members permitting the separation thereof at the bottom; a folding brace member interposed between said side members and adapted to retain said side members separated.

15. A rocking horse comprising two like side members having rockers; connections interposed between the upper portions of said members permitting the separation thereof at the bottom; a two part brace hinged together and at its ends to said side members; and a locking member to retain said brace extended.

Signed by me at Winchendon this 24th day of May, 1912.

ATHERTON D. CONVERSE.

Witnesses:
ARTHUR F. EVANS,
HAZEL A. BETTERLEY.